July 29, 1947.   R. L. LINCOLN   2,424,572
DUST COLLECTOR
Filed June 11, 1945   2 Sheets-Sheet 2

Inventor
Roland L. Lincoln

Patented July 29, 1947

2,424,572

UNITED STATES PATENT OFFICE 2,424,572

DUST COLLECTOR

Roland L. Lincoln, Dover, Mass., assignor to B. F. Sturtevant Company, Hyde Park, Boston, Mass.

Application June 11, 1945, Serial No. 598,819

7 Claims. (Cl. 183—80)

1

This invention relates to cinder and dust collectors.

High efficiencies in a cyclone type collector, are attained by using a number of relatively small cyclones arranged in rows across the dust laden gas stream. This invention provides such a collector which has the advantages that the collector is more compact and efficient than prior collectors of this type. These advantages result from the individual cyclones being more closely spaced than was formerly thought possible, from the gas flow being straight through, and from a reduced draft loss.

A feature of the invention resides in arranging the cyclone tubes in rows with their axes parallel to the direction of gas flow which in a preferred embodiment of the invention is horizontal, whereby the collector can be installed in a small space in a horizontal duct.

Another feature of the invention resides in arranging the small cyclone tubes employed, in groups, each group including two aligned rows of tubes, the dust laden gas passing between the groups, and the tubes bordering the gas passages having spaced tongues provided therein which provide passages for the entry of the dust laden gas into the tubes, and which impart spin to the gas as it enters the tubes.

Another feature of the invention is that the pairs of tube rows forming each of said groups have dust discharge outlets connecting into a common dust disposal chamber arranged vertically above a dust hopper, the chambers being in advance with respect to gas flow, of the tubes, and being spaced apart for providing said gas passages therebetween.

Objects of the invention are to reduce the size of dust and cinder collectors, and to increase the efficiency and to reduce the draft loss of such collectors.

The invention will now be described with reference to the drawing, of which:

Figure 1:
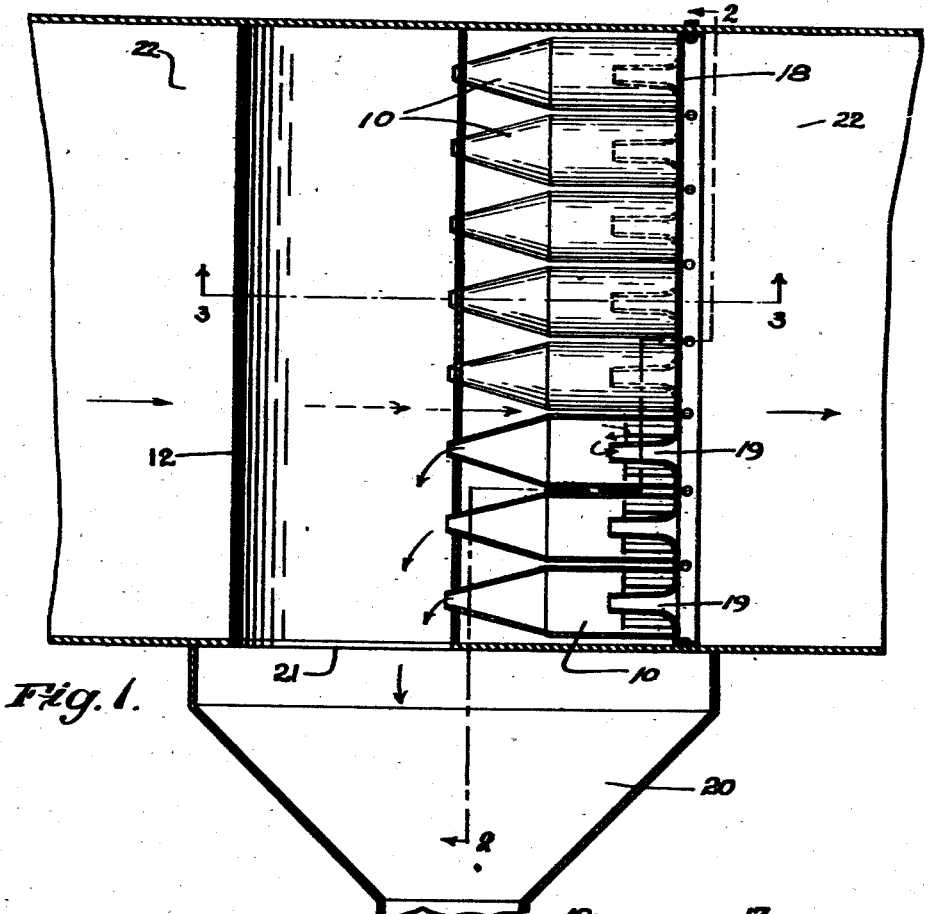
Fig. 1 is a side elevation, in section, of a dust and cinder collector embodying this invention, the section being taken along the lines 1—1 of Fig. 2.
Figure 3:
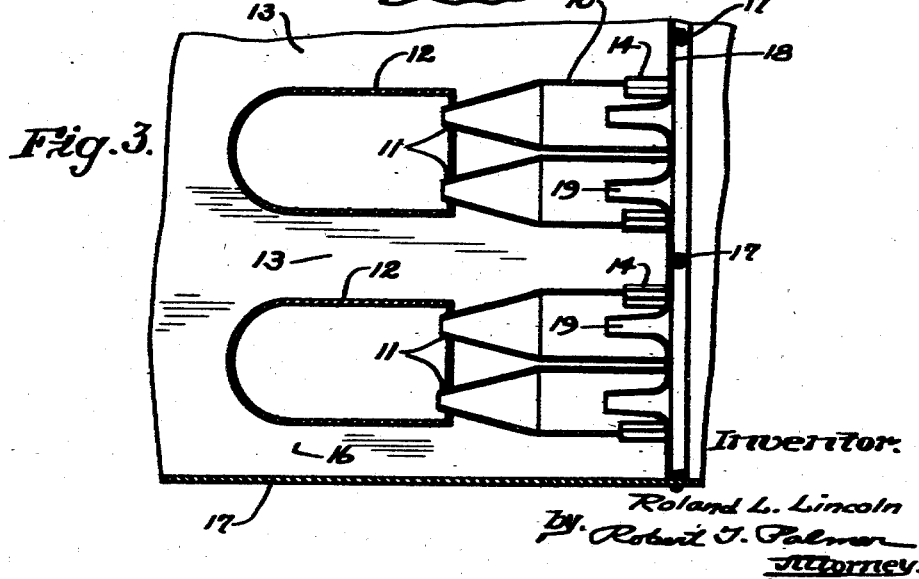
Fig. 3 is a sectional view along the lines 3—3 of Fig. 1.
Figure 2:
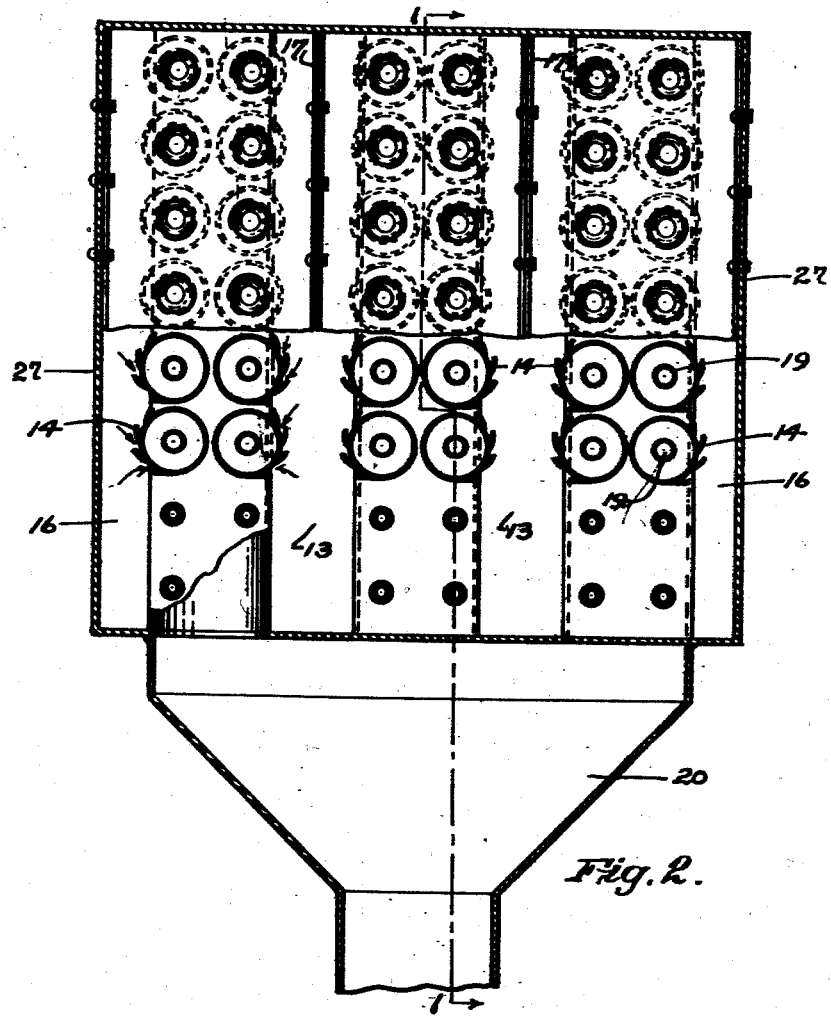
Fig. 2 is a sectional view along the lines 2—2 of Fig. 1.

The cyclone tubes 10 are arranged with their axes extending horizontally, in vertical rows, in

2 closely together, but the pairs of tubes are spaced substantial distances apart forming therebetween the gas passages 13.

The tubes 10 of each pair have converging dust outlet portions 11 extending into the dust receiving chambers 12. All of the tubes in the pairs of closely spaced rows discharge into a common chamber 12. The chambers 12 are spaced apart forming gas passages therebetween which are continuations of the gas passages 13.

The downstream ends of the tubes 10 have the spaced outwardly extending tongues 14 forming tangential, spin inducing, gas passages into the tubes. The tongues 14 are formed only in the sides of the tubes which face on the gas passages 13, and which face on the gas passages 16 between the end tubes 10 and the end walls 27 of the collector unit. The sides of the tubes opposite the gas passages do not have the tongues 14, enabling the tubes between adjacent gas passages to be placed very close together for conserving space and material.

The vertical plates 18 which are joined together at 17, extend completely cross-wise the unit at the downstream end thereof, and extend across the downstream ends of the tubes 10. The plates 18 have the outlet passages 19 formed therein in axial alignment with the tubes 10. The passages 19 are the dust free outlet passages from the tubes 10, and extend from the outlet ends thereof, substantially beyond the tongues 14 whereby the gas entering the tubes between the tongues, cannot pass directly into the passages 19.

The plates 18 through extending completely crosswise the unit at the downstream end thereof, close off the gas passages 13 and 16, causing the gas from such passages to pass between the tongues 14 and to enter the tubes 10.

The dust hopper 20 extends below the dust receiving chambers 12, the lower ends 21 of which are open so that the dust in the chambers 12 falls into the hopper 20.

The dust collector unit is adapted, as best illustrated by Fig. 1, to be inserted in a horizontally extending gas duct 22, which, for example, may connect with the inlet of an induced draft fan in a steam power plant.

In operation, one or more fans connected to the duct 22, force the dust and/or cinder laden gas through the passages 13 and 16, the gas being caused by the plates 18 to pass between the tongues 14 into the tubes 10. The tangential placement of the tongues 14 causes the gas enspin. The spinning gas throws the dust or cinders outwardly against the interior surfaces of the tubes 10 and causes same to pass through the converging outlet portions of the tubes into the dust receiving chambers 12. The dust free gas passes through the gas outlet passages 18 back into the duct 22.

Figure 4:
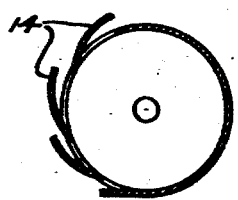
Fig. 4 is an enlarged plan view in section, of one of the cyclone tubes.

A feature of the invention is that the spin inducing tongues 14 in the cyclone tubes 10, are easily and cheaply produced by cutting spaced, parallel slots in the end portions of the tubes which are of metal, and then bending the metal between the slots outwardly as illustrated by Fig. 4 so that they form substantially tangentially extending tongues.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. A dust collector comprising a housing having a gas inlet in one side thereof, a hopper below said housing, a plurality of spaced dust chambers extending substantially vertically in said housing above said hopper and downstream with respect to gas flow of said inlet, a plurality of cyclone tubes having substantially horizontal axes in said housing downstream with respect to gas flow of said chambers, spaced spin inducing tongues in the gas inlet ends of said tubes, means forming a wall extending across the side of said housing opposite said inlet and extending across said gas inlet ends of said tubes, and axial gas free outlet passages extending from the interiors of said tubes through said wall, said tubes being arranged in vertical rows in alignment with said chambers and having their dust outlet ends located upstream in said housing of their said gas inlet ends and connected to the interiors of said chambers on the downstream side thereof for discharging dust thereinto, the gas from said inlet passing between said chambers and between said tongues into said gas inlet ends of said tubes, said chambers discharging the dust into said hopper.

2. A dust collector according to claim 1 in which said tubes are arranged in a plurality of spaced groups, each group including a pair of substantially vertically extending rows of tubes, the tubes of each group having their dust outlet ends connected to the interior of a common dust chamber.

3. A dust collector comprising a housing having a gas inlet in one side thereof, a hopper below said housing, a plurality of dust chambers extending substantially vertically in said housing above said hopper and downstream with respect to gas flow of said inlet, said chambers being spaced apart for forming gas passages therebetween, the end chambers being spaced from the end walls of said housing for forming gas passages therebetween, a plurality of groups of cyclone tubes having substantially horizontal axes, each of said groups including a pair of substantially vertically extending rows of tubes, said groups being in alignment with said chambers downstream with respect to gas flow thereof, the tubes of each of said groups having their dust outlet ends connected to the interior of a common dust chamber, said tubes having spaced spin inducing tongues in the gas inlet ends thereof, said tongues extending into said passages, means forming a wall extending across the side of said housing opposite said inlet and extending across said gas inlet ends of said tubes, and axial gas free outlet passages extending from the interior of said tubes through said wall, said chambers receiving dust from said tubes and discharging the dust into said hopper.

4. A dust collector according to claim 3 in which the said rows of tubes of each of said groups are spaced apart distances which are substantially less than the distances between said groups.

5. A dust collector comprising a housing having a gas inlet, a hopper below said housing, a plurality of spaced dust receiving chambers in said housing above said hopper and downstream with respect to gas flow of said inlet, a plurality of cyclone tubes having substantially parallel axes in said housing downstream with respect to gas flow of said chambers, gas spinning means in the gas inlet ends of said tubes, means forming a wall extending across said housing and extending across said gas inlet ends of said tubes, and means forming axial gas free outlet passages extending from the interiors of said tubes through said wall, said tubes being arranged in vertical rows in alignment with said chambers and having their dust outlet ends located upstream in said housing of their said gas inlet ends and connected to the interiors of said chambers in the downstream ends thereof for discharging dust thereinto, the gas from said inlet passing between said chambers and through said spinning means into said tube inlets, said chambers having openings in their lower ends for discharging the dust therein into said hopper.

6. A dust collector according to claim 5 in which said tubes are arranged in a plurality of spaced groups, each group composed of a pair of rows of tubes, the tubes of each group being aligned with and having their dust outlet ends connected to the interior of a common dust chamber.

7. A dust collector according to claim 1 in which said tubes are arranged in a plurality of spaced groups, the tubes of each group having their dust outlet ends connected to the interior of a common dust chamber, the rows of tubes of each group being spaced apart distances which are substantially less than the distances between said groups.

ROLAND L. LINCOLN.

REFERENCES CITED

The following references are of record in the file of this patent:

UNITED STATES PATENTS

| Number | Name | Date |
|---|---|---|
| 1,886,548 | Horne et al. | Nov. 8, 1932 |
| 2,069,483 | Skajaa | Feb. 2, 1937 |
| 1,970,077 | Collins | Aug. 14, 1934 |
| 2,004,468 | Hawley | June 11, 1935 |
| 2,323,708 | Danz | July 6, 1943 |

FOREIGN PATENTS

| Number | Country | Date |
|---|---|---|
| 328,653 | Great Britain | May 2, 1930 |